United States Patent

[11] 3,579,972

| [72] | Inventors | Levi L. Sears<br>Oxnard;<br>Richard N. Sommer, Pacoima, Calif. |
|---|---|---|
| [21] | Appl. No. | 817,538 |
| [22] | Filed | Apr. 18, 1969 |
| [45] | Patented | May 25, 1971 |
| [73] | Assignee | SSP Industries<br>Burbank, Calif. |

[54] AGRICULTURAL IMPLEMENT
4 Claims, 13 Drawing Figs.

[52] U.S. Cl. ................................................ 56/370
[51] Int. Cl. .......................................... A01d 79/00
[50] Field of Search ........................................ 56/370,
25.4

[56] References Cited
UNITED STATES PATENTS
3,334,476  8/1967  Engler ........................ 56/25.4X FOREIGN PATENTS
450,793  4/1960  Switzerland ................. 56/370
456,225  5/1968  Switzerland ................. 56/370

Primary Examiner—Robert Peshock
Attorney—Huebner and Worrel

ABSTRACT: An agricultural implement to be moved by a powered vehicle for collecting brush and cuttings and the like, into a single windrow. The implement includes a plurality of spring-steel tines arranged on a power-actuated revolving annular support, and cam means associated with said tines to move them from a vertical raking position to a discharging position.

Further, a fender may be utilized for specific raking and discharging operations when the trees involved are citrus, to enable the implement to function under the tree skirts.

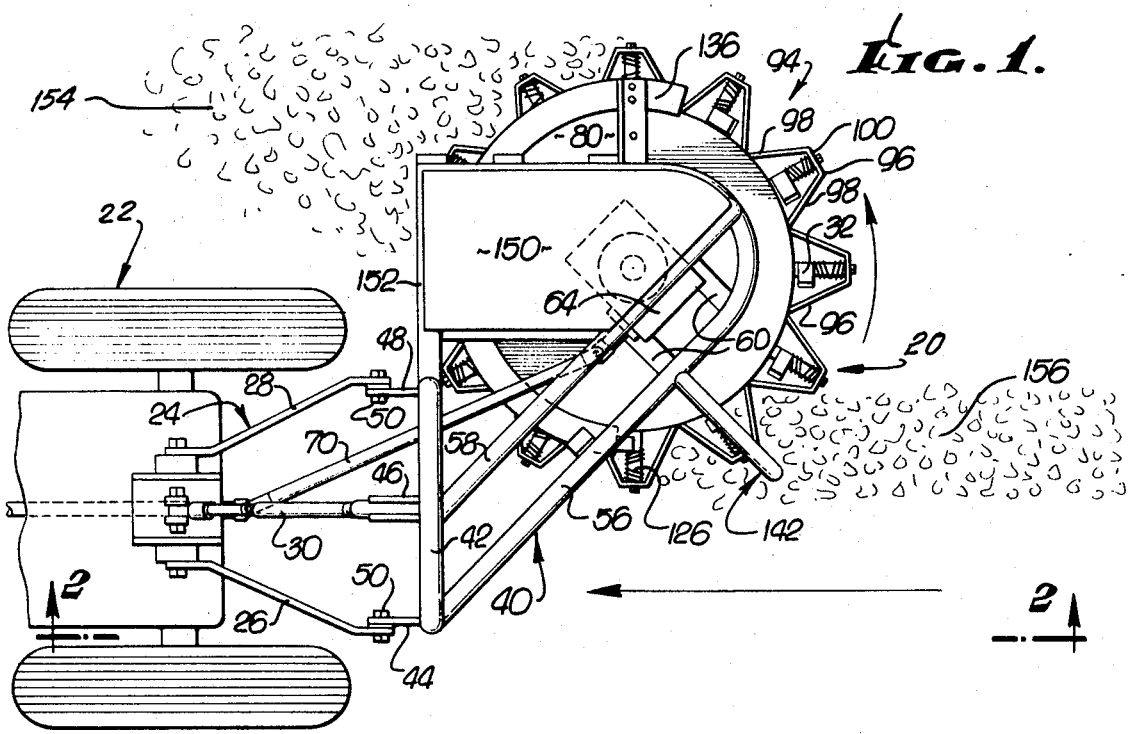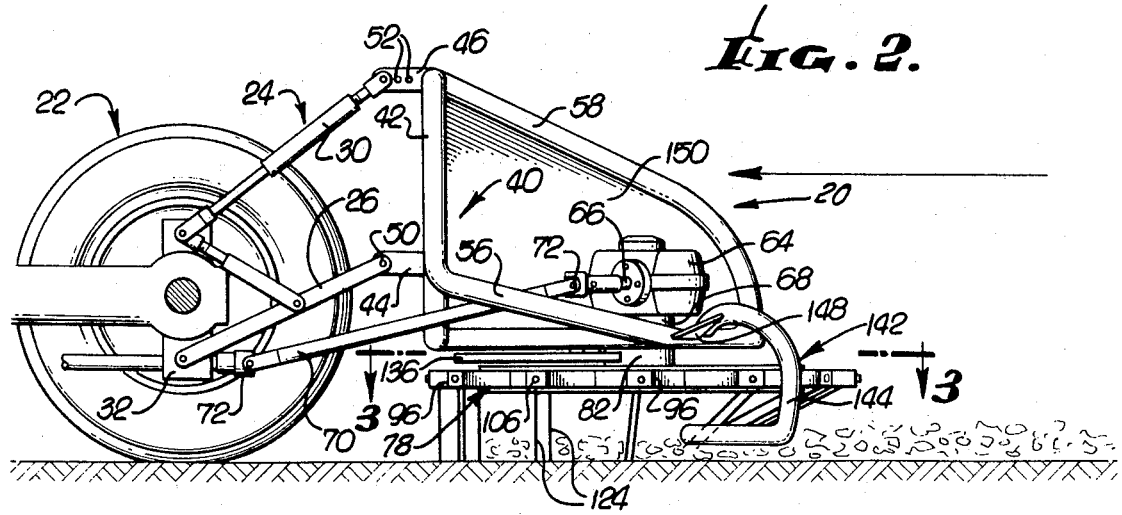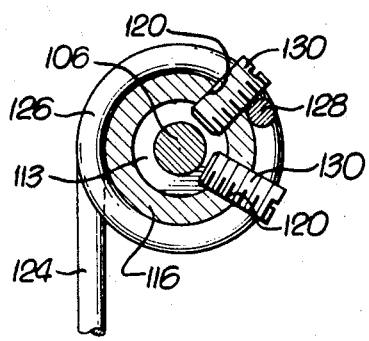

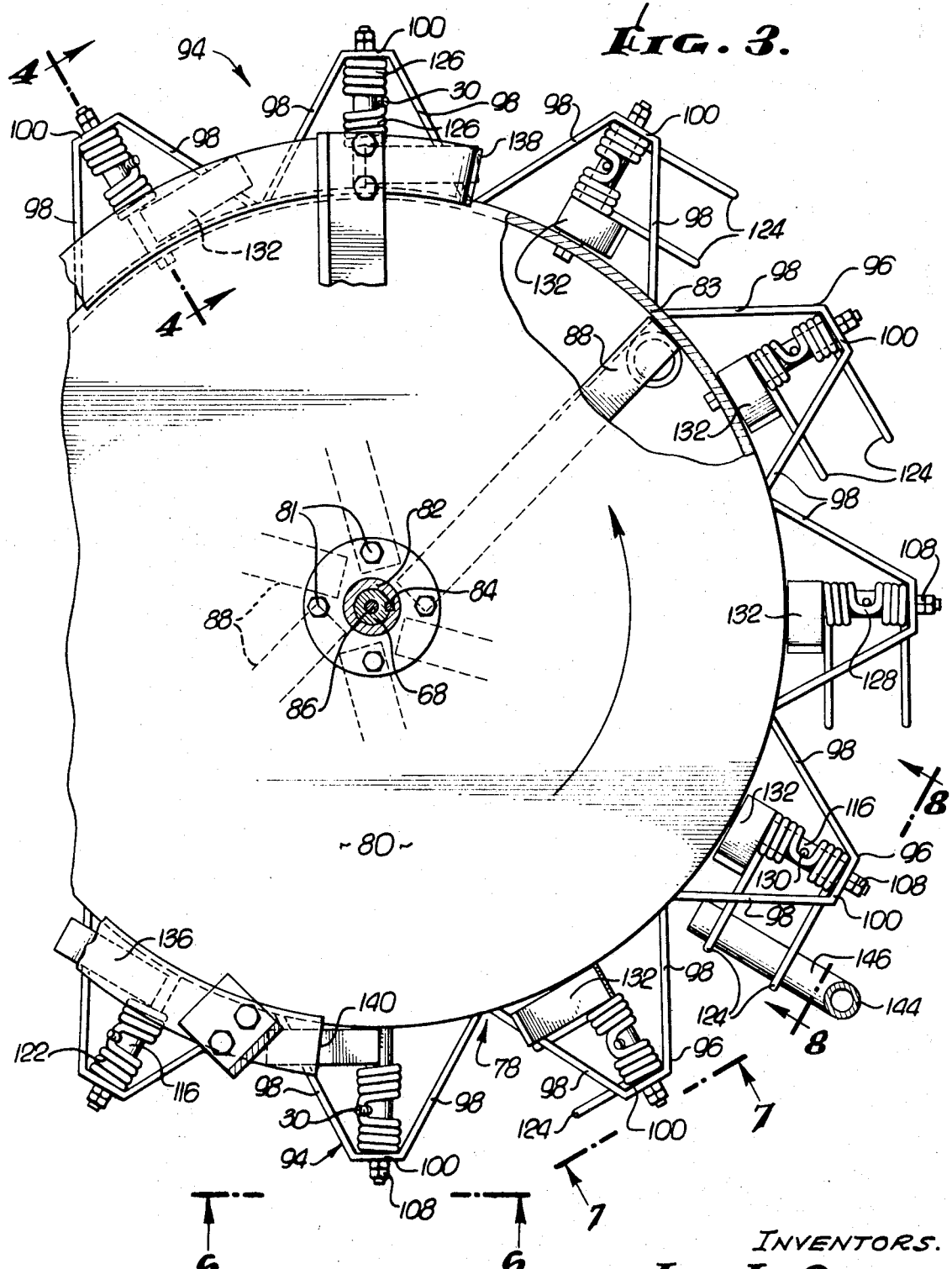

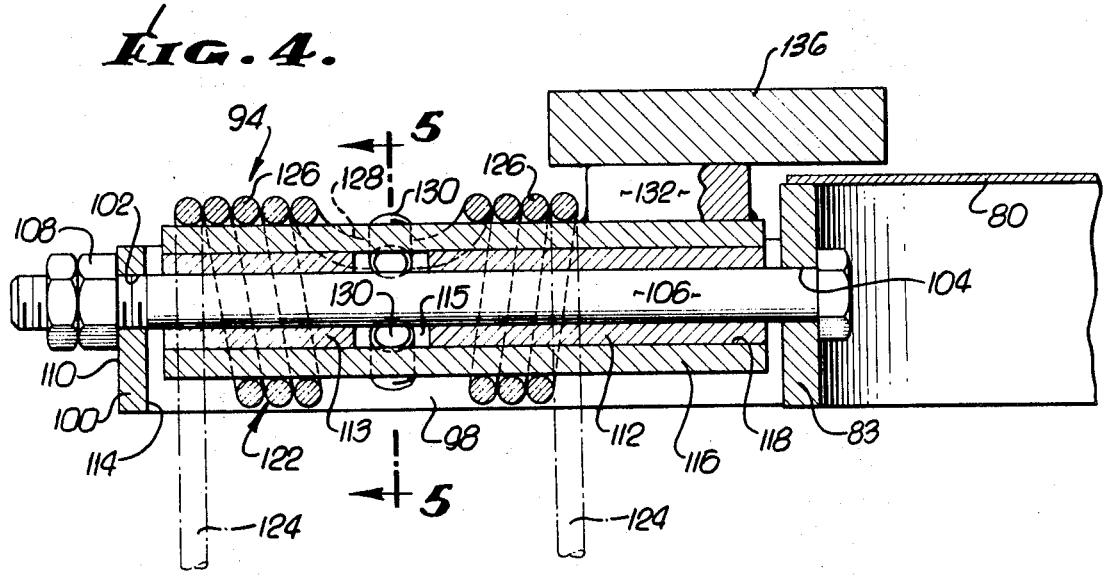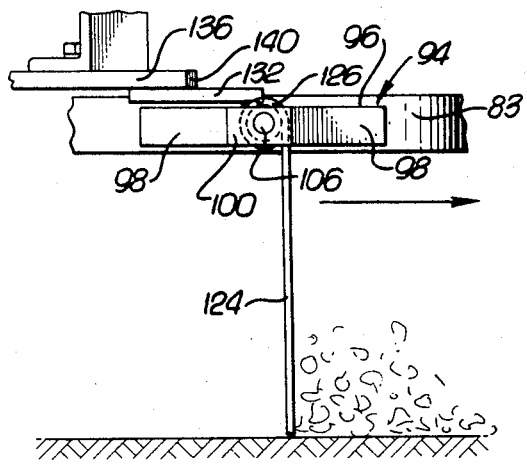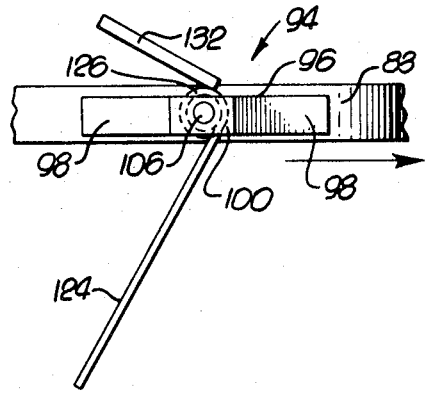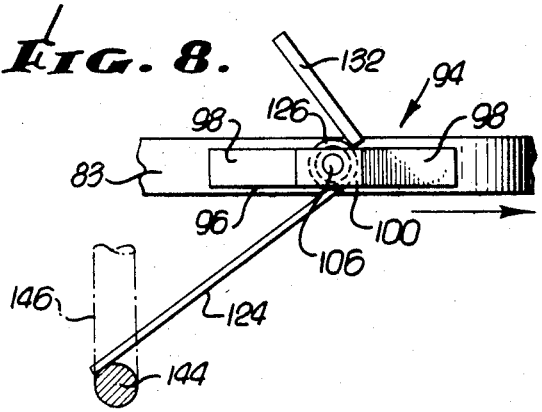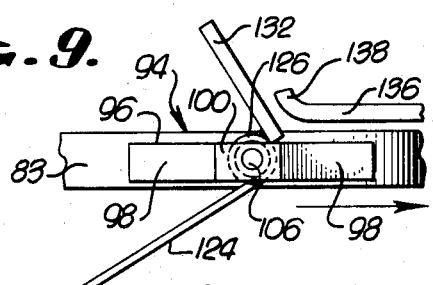

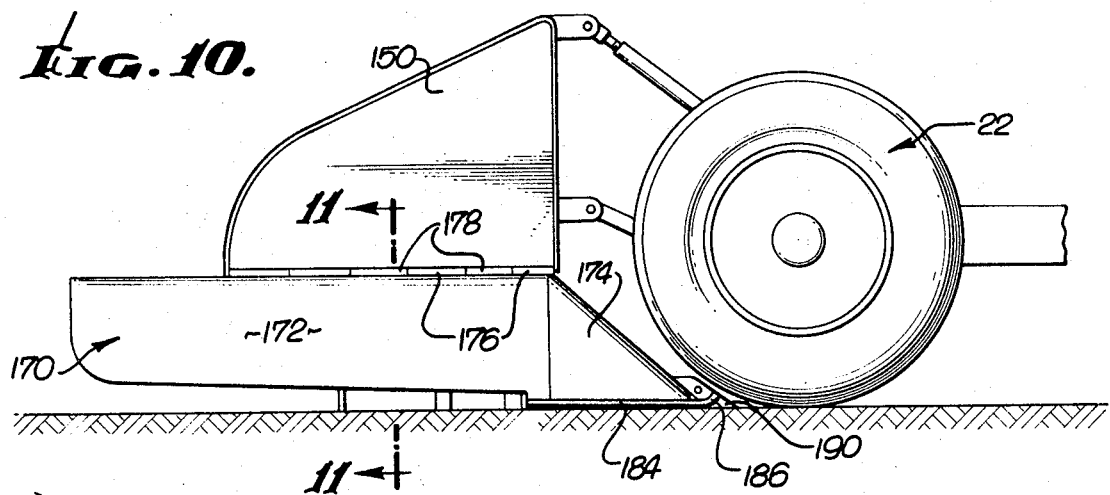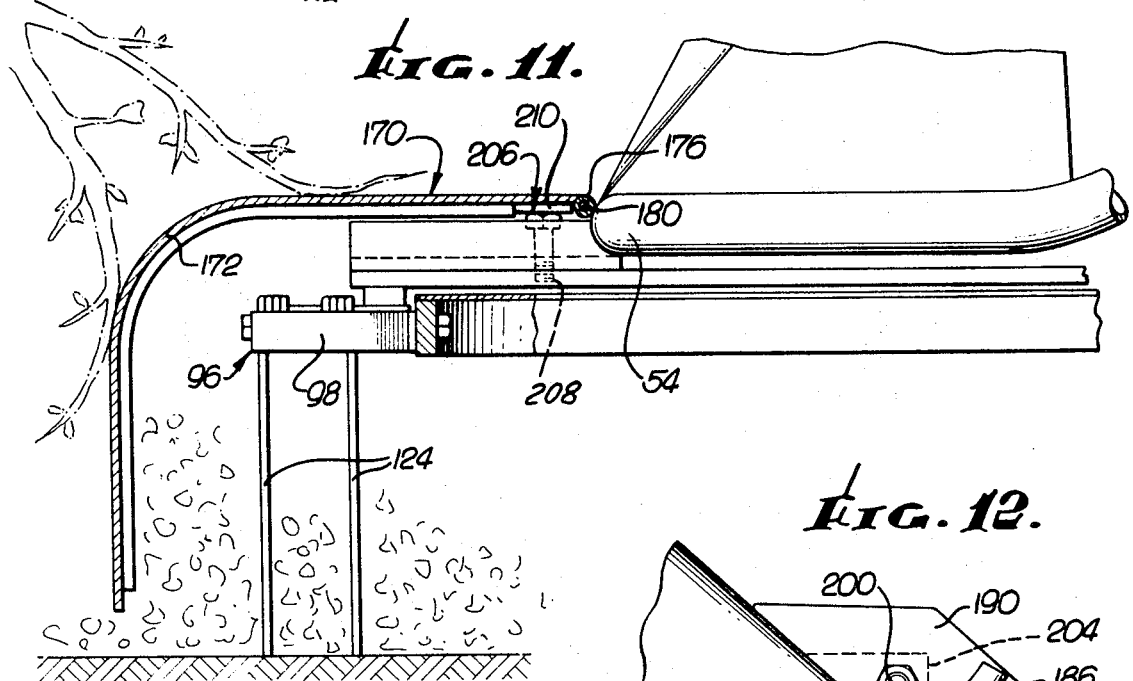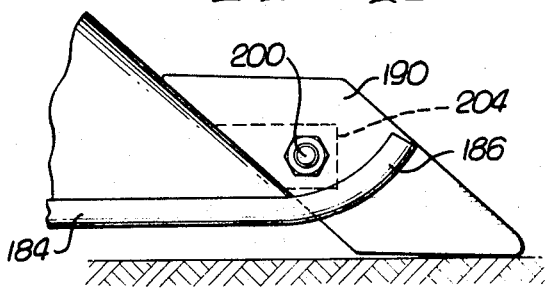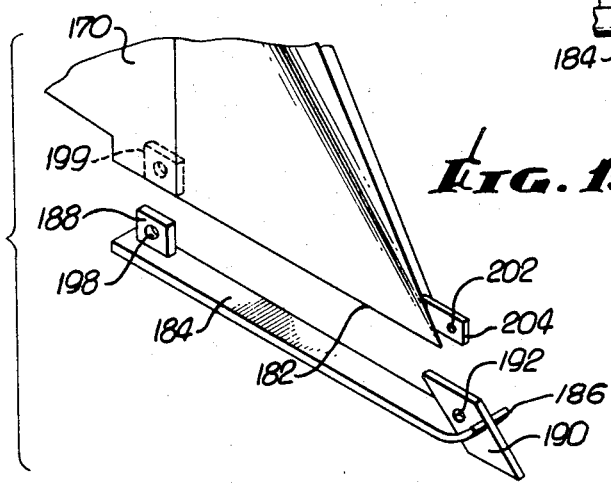

AGRICULTURAL IMPLEMENT

BACKGROUND OF THE INVENTION

Heretofore, there have been no specific agricultural implements which could collect brush such as cuttings and leaves from under citrus trees with large skirts extending down to ground level, or which could run up to a deciduous tree trunk because of the position of the power vehicle or because of the structural design of the rake.

One prior art rake utilizes a rotary disc with tines which are mounted between two ground wheels. Such structure could not pass under a citrus tree, nor could it gather brush up to the trunk of a deciduous tree.

Heretofore, the only adequate way of accomplishing a collection of brush and cuttings around trees in an orchard has been to rake by hand. This has been cumbersome, time-consuming and expensive.

SUMMARY OF THE INVENTION

This invention relates to an implement which may be attached to a conventional tractor having standard attaching points and a power takeoff.

Further, the implement is constructed and positioned to extend outwardly to the side beyond the vehicle so that it may be utilized for collecting brush up to a trunk of a tree or plant and under citrus trees.

In substance, the implement includes a frame with a reduction gear assembly mounted thereon adapted to be connected with a power drive takeoff from a tractor. The reduction gear drives an annular support to which are pivotally mounted circumferentially therearound, a plurality of spring-steel tines. Cam means are provided to retain a succession of tines in a generally vertical raking position, while including means to also move a succession of tines from the raking position to a generally horizontal discharging position wherein the collected brush is formed in a neat windrow between the rows of trees or vines.

Additionally, the implement can be fitted with a protection fender to lift the skirt branches of citrus trees and protect the branches and fruit during brush collecting operations.

These and other advantages and details of construction will become apparent from the following description of the drawings wherein:

DESCRIPTION OF THE DRAWINGS

FIG. 1 is a top plan view of the agricultural implement and its position in relation to the pulling vehicle, as well as the movement of the brush collected;

FIG. 2 is a side elevational view of the agricultural implement taken on line 2-2 of FIG. 1;

FIG. 3 is an enlarged fragmentary top view of the annular support and tines of the agricultural implement taken on line 3-3 of FIG. 2;

FIG. 4 is a detailed sectional view of the attachment means of one of the tines to the annular support taken on line 4-4 of FIG. 3;

FIG. 5 is a cross-sectional view of a tine taken on line 5-5 of FIG. 4;

FIGS. 6, 7, 8 and 9 are progressive views showing the positioning of a tine during its raking of brush and discharge of the same;

FIG. 10 is a side elevational view of the agricultural implement with a protection fender hingedly mounted thereon;

FIG. 11 is a view taken on line 11-11 of FIG. 10 showing a cross section of the protection fender and elevation adjustment means;

FIG. 12 is a detailed view of a ski and plow portion of the protection fender; and FIG. 13 is an exploded view of a portion of the protection fender and the ski and plow portion.

DETAILED DESCRIPTION OF THE PREFERRED EMBODIMENTS

This invention relates to an agricultural implement generally designated 20, which is adapted to be attached to and suspended from a power vehicle 22, such as a conventional tractor having a conventional three-point hitch 24. The hitch 24 includes double action draft bars 26 and 28, and a top link adjustable bar 30. Further, vehicle 22 preferably includes a rearwardly directed power takeoff coupling 32, if power is to be taken from the vehicle 22 to operate the implement.

While in the preferred embodiment the implement 20 is pulled by the vehicle 22, it should be realized that the implement could be mounted on the front or side of the vehicle 22. Such locations would only necessitate simple changes in the mounting members and substitution of a hydraulic motor for the power takeoff couple 32.

The agricultural implement 20 includes a support frame 40, preferably of steel pipe welded construction. The frame 40 includes a forward arch section 42, which extends vertically and has coupling brackets 44, 46 and 48, adapted to be coupled with the three-point hitch 24 of the tractor by any fastening means such as nuts and bolts 50. The coupling bracket 46 can be bifurcated, as illustrated, and a plurality of adjustment holes 52 is provided so that the implement 20 can be tilted relative to ground level.

The frame 40 also includes a horizontal bar 54, which extends outwardly from the arch section 42, and on the same plane therewith. Then the bar 54 is bent at a right angle to that plane and extends rearwardly. Extending from the opposite side of the arch section 42 is a side bar 56, which angles downwardly and outwardly, joining the portion 54. Thus, the frame 40 in side elevation generally forms a right angle with the arch vertical, and from the top the frame 40 is generally triangular (see FIG. 1), with the arch 42 forming the base, and the portion 54 and side bar 56 the sides thereof.

When in coupled arrangement with the three-point hitch 24, preferably part of the frame 40 will extend to the side beyond the vehicle or tractor 22, as best seen in FIG. 1.

As an additional structural reinforcement, a support 58 extends from the top of the arch 42 opposite the coupling bracket 46, rearwardly and downwardly terminating on the portion 54 and on a parallel vertical plane with the side bar 56.

Secured between horizontal bar 54 and side bar 56 are a pair of mounting brackets 60, upon which is mounted a conventional reduction gear box 64 of a preferred reduction of 10 to 1. The box 64 has a power receiving connection 66 and a vertical drive shaft 68 which extends downwardly from the box 64. The reduction gear box 64 is coupled to the power takeoff 32 by a drive shaft 70 which utilizes universal coupling joints 72. Thus, when the power takeoff 32 of the tractor 22 rotates, the drive shaft 70 will rotate and by a series of conventional reduction gears (not illustrated) within the box 64, the vertical drive shaft 68 of the box 64 will be rotated at a slower r.p.m. than the power takeoff. The necessity of this reduction gear box 64 will become apparent during the course of this description.

While a power system taken from the vehicle 22 has been illustrated and is preferred, such arrangement can be replaced by a direct drive power source secured to the frame 40, without departing from the spirit of the invention.

Journaled on the vertical drive shaft 68 is an annular rotatable support designated 78. This support preferably includes a circular flat disc 80, with an annular flange 83, and having a coupling sleeve 82 located at the center of the disc 80, extending vertically upwardly. The sleeve is mounted on the disc 80 by bolts 81. The interior of the sleeve 82 corresponds with the diameter of the vertical drive shaft 68, and the shaft 68 is fitted within the sleeve 82 and journaled thereto by a key 84 for simultaneous rotation. The disc 80 is held to the drive shaft 68 by bolt 86, which passes through the disc 80 into shaft 68.

To give the circular flat disc 80 rigidity, a plurality of support bars 88 radiates outwardly from the center of the disc 80 to the flange 83.

On the annular rotatable support there is mounted a plurality of tine assemblies 94, which rakes the brush and discharges it in a windrow. Each of the tine assemblies is identical, so the explanation of one will suffice for all.

The assembly 94 includes a tine mounting bracket 96, formed of legs 98 and an end wall 100. The legs 98 are each preferably welded to the exterior of the flange 83 of the disc 80, and each extends outwardly on a converging angle to a point where the end wall 100 will bridge the two legs 98. In FIG. 2 it will be seen that the configuration of the bracket 96 is frusto-pyramidal. The end wall 100 is generally parallel with flange 83 of the disc 80. It has been found that with the converging sidewalls, brush and cuttings will not catch therein and disrupt operations of the implement.

Extending through opening 102 of end wall 100 and opening 104 of flange 83, is a tine pivot pin in the form of a bolt 106, and adjustment nuts 108 are threadably secured on the bolt and bear against the exterior surface 110 of the endwall 100.

Mounted on the bolt 106 are freely rotatable, elongated tubular bearings 112 and 113 which are axially spaced from each other creating an annular space 115 around the bolt 106. It is preferred that the bearings 112 and 113 not be of a combined length to abut the flange 83 and end wall 100.

Mounted around the bearings 112 and 113 is a tine adjustment sleeve 116. The sleeve 116 has an inner bore 118 slightly larger than the exterior circumference of the bearings 112 and 113 and is independently rotatable. The sleeve 116 has a pair of vertically aligned threaded adjustment bores 120 communicating with the annular space 115 which will be more fully explained.

On each of the sleeves 116 there is positioned a raking tine means 122. The raking tine means 122 preferably includes a pair of spaced apart, parallel, radially aligned tines 124, which are formed from spring steel and are preferably circular in cross section. The tines 124 are of a corresponding length and are resilient in nature. They are integral, yet separately yieldable because each tine 124 includes a plurality of spring convolutions 126 wrapped around the sleeve 116, which extend toward each other. The two series of convolutions 124 are tied together by a bridge section 128, intermediate each tine 124.

The spring convolutions 126 are normally of a slightly larger diameter than the sleeve 112 and can rotate independently within limits to be described. A pair of stop screws 130 are each threaded in respective bores 120 and with a portion elevated above the sleeve 116 and portion extending into the annular space 115 between bearings 112 and 113, as best seen in FIG. 5. Each stop screw 130 acts as a stop to restrict complete rotation of the tines 124 during operation of the implement 20.

While it is preferred that a pair of tines 124 be used at each station around the disc 80, a lesser or greater number could be used without departing from the spirit of the invention.

There is also a cam means which includes a cam follower 132 secured inwardly of the raking tine means 122 on the sleeve 116, which is mounted to extend rearwardly of the line of travel of the tines 124, and outwardly beyond the sleeve 116.

The cam follower 132 is adapted to engage a semicircular flat cam bar 136, which is mounted to the frame 40 slightly above the front half of the peripheral margin of the disc 80. As best seen in FIG. 3, a portion of the cam bar 136 extends outwardly of the margin of the disc 80.

The cam bar 136 at the entry end 138 is curved upwardly to smoothly depress the cam follower 132 to a horizontal position as it moves thereunder, and it will then ride under the cam bar 136, as best seen in FIG. 4. The discharge end 140 of the cam bar 136 is preferably diametrically opposite the entry end 138.

Projecting outwardly from the side bar 56 of the frame 40 is a trip bar assembly 142, including an outwardly and downwardly curved support section 144, and an inwardly bent, generally horizontal, tine tripping section 146. As can be seen from FIG. 3, the tine tripping section 146 extends across the path of the tines 124. A gusset 148 is welded or otherwise secured to the side bar 56, and the trip bar assembly 142, to assure added stability.

It is important to note that the trip bar assembly 142 should be positioned for engagement by the tines 124 relatively close to the discharge end 140 of the cam bar 136, so that brush raked by the tines will be assured of being discharged by the tines 124 within the area of the windrow being created by the collected brush. Thus, the cam follower 132, cam bar 136, and trip bar assembly 142, are the cam means to vertically position the tines 124 and to assure discharge of gathered material.

The implement 20 is also preferably provided with a sheet metal hood 150, including a front plate section 152. The hood 150 is mounted on the frame 40. The purpose of the hood 150 is to deflect tree branches, fruit or foliage from the reduction gear box 64, whereby they will not become entangled with the rotating shafts and cause damage thereto.

OPERATION

In operation the implement 20 is secured to the three-point hitch 24 of the tractor or vehicle 22. The implement 20 is suspended on these points and the hitch is adjusted so that when the tines 124 are in a vertical position, there is a slight clearance between the tip of the tine and the ground.

After the implement is properly adjusted for height from the ground, the drive shaft 70 from the gear box 64 is attached to the tractor or vehicle power takeoff 32.

When the tractor is started, the power takeoff 32 is engaged, and the drive shaft 70 commences rotation, which in turn causes the series of conventional gears in the reduction gear box 64 to rotate the vertical disc driving shaft 68. It has been found that a reduction in r.p.m. of the power takeoff drive shaft 70 to the vertical disc driving shaft 68 of about 10 to 1 is satisfactory for raking operations.

With the rotation of the shaft 68, the annular rotatable support 78, and in turn the tine assemblies 94, will rotate in a counterclockwise direction. In other words, the tines 124 will rake toward the direction of travel of the tractor 22 and implement 20.

As the annular support 78 rotates, the cam follower 132 of each of the tine assemblies 94, will engage the entry end of the cam bar 136 (FIG. 9) and be depressed to a horizontal position where the tines 124 will be in a retained vertical raking position as the cam plate 132 rides under the cam bar 136. During the vertical position of the tines 124, they are raking brush, cuttings and foliage 154 from around a tree in a circular path, best seen in FIG. 1, from the outside inwardly to a position opposite the entry end 138, where the brush will be discharged from the tines in a windrow 156, behind the tractor 22. During operation, a series of successive tines will be raking and others will be discharging the gathered material.

The discharge of the brush is accomplished as the tine assemblies 94 move out from under the cam bar 136 (FIGS. 6 and 7), the resistance of the brush will overcome the tines 124, which will begin to pivot upwardly, allowing the brush to remain piled at that point. However, to complete the discharge of the brush and remove brush entangled with the tines 124, the cam means trip bar assembly 142 (FIG. 8) will be successively engaged by the tines 124, and they will be rotated even further toward the horizontal removing the brush thereon. This will assure that there is a total discharge of gathered material.

As can be seen from the drawings, the trip bar assembly 142 is preferably spaced relatively close to the discharge end 140 of the cam bar 136, so that all of the brush collected by a pair of tines 124 will be deposited in the windrow. Preferably, the spacing calls for the tripping of a pair of tines 124 just as the pair of tines to the rear thereof are released from their vertical position as the cam plate 132 moves from under the cam bar 136.

It should also be noted that during the rotation of the annular support 78, the spring steel tines 124, due to the construction previously described, are resilient and flexible, which enhances their raking value as they rotate and rake, then discharge the brush and rake again.

With the position of the agricultural implement 20, that is, its tines 124, extending to the side and beyond a plane of the side of the tractor 22, the tractor operator can move the implement 20 immediately adjacent to the trunk of a tree or plant without entangling the tractor or the operator with the tree limbs and branches.

MODIFIED DEVICE

In FIGS. 10 through 13, there is illustrated a fender 170, which may be attached to the implement 20, as previously described, when raking brush and cuttings from under citrus trees.

As is the case with mature citrus trees, they normally have branches which extend outwardly from the tree trunk very close to the ground, forming skirts that normally prevent raking thereunder unless lifted up by hand. With the fender 170, the implement 20 can be moved under the tree skirts wherein the skirt is lifted, and damage by the moving tines 124 to branches and fruit is prevented.

The fender 170 includes an elongated outwardly and downwardly extending shield 172, which overhangs the extended tines 124, and a front semirounded nose portion 174.

Along the elongated marginal edge 176 of the fender 170, a hinge is formed which alternates with hinge means 178, welded or otherwise secured to the horizontal bar 54 of frame 40. A hinge pin 180 passes through the hinge means so that the fender 170 can move independently up and down, or float along the ground over uneven surfaces.

Secured to the bottom edge 182 of the semirounded nose portion 174 is a replaceable, generally flat, elongated ski 184 having a shovel forward end 186. The ski 184 includes a rear attachment bracket 188, and a forward plow blade means 190 having an opening 192. In order to mount the ski 184 in place, a bolt (not illustrated) extends through opening 198 in the rear bracket 188, and into a bore of angle brace 199. At the front of the ski 184 a bolt 200 passes through opening 192 and opening 202 of a front fender bracket 204. With the ski 184 so positioned, the fender 170 will bear on the ski, which in turn will ride on the ground surface and prevent the fender 170 from digging into the ground along its length.

The plow blade 190 is constructed so that it will extend slightly below the plane of the bottom of the ski 184, as best seen in FIG. 12. The purpose of the plow blade 190 is to dig or bite slightly into the ground as the implement 20 is moved along, and stabilize the fender 170 so it will not bounce erratically up and down, causing damage to the tree skirts or fruit thereon.

There is also provided a height adjustment means 206, which includes a bolt 208, mounted threadably in a mounting bracket 60 for vertical movement. The bolt 208 is adapted to engage a plate 210 secured to the underside of the elongated shield 172 adjacent the hinge. As the bolt 208 is threadably elevated, it will engage the plate 210, whereby the fender 170 can be raised or lowered relative to the ground level. In certain terrain, it may be necessary to raise or lower the fender 170, whereby the ski 184 is not on a horizontal plane with the tractor 22 or the implement 20, thus by adjusting the bolt 208, the proper alignment can be achieved.

While in the preferred embodiment, the implement 20 is fully suspended from the vehicle 22, in large models it may be desirable to provide a trail wheel or wheels to prevent sagging of the implement. Such modification, however, would not depart from the spirit of the invention.

Although the invention has been herein described and shown in what is conceived to be the most practical and preferred embodiment, it is recognized that departures in addition to those discussed above may be made therefrom within the scope of the invention, which is not to be limited to the details disclosed herein, but is to be accorded the full scope of the claims, so as to embrace any and all equivalent structures and devices.

We claim:

1. A raking implement adapted to be mounted on and moved by a vehicle to rake brush and cuttings, and the like, away from the trunk of a tree or plant and into a windrow comprising: a frame; means for mounting the frame on the vehicle whereby the frame is suspended above the ground; a raking assembly including an annular rotatable support including a peripheral flange; said support journaled on the frame with the journal axis generally vertical and said support disposed generally horizontally; a plurality of brackets extending radially outward from the flange; each bracket having two converging sides and an outer end wall bridging said sides; a tine pivot pin extending between said flange and said outer end wall; a pair of resilient raking tines in spaced radial alignment one from the other, carried by each of said pivot pins; said pairs of tines are arranged in a pattern which disposes them successively laterally outward away from the vehicle; cam means including a semicircular cam bar mounted on said frame and overlying a plurality of tines, and cam followers secured to said tine pivot pins adapted to engage said cam bar and ride thereunder during rotation of said annular support to maintain said pairs of tines in vertical raking position to a point generally diametrically opposite the cam followers' initial engagement with said cam bar; trip bar assembly means mounted on said frame in the path of said tines and ahead of said cam means to sequentially elevate said pairs of tines to assure discharge of said raked material; and power means to rotatably drive the annular support.

2. A raking implement as defined in claim 1, wherein a fender is pivotally mounted on said frame overhanging the pairs of tines which are disposed successively laterally outward away from the vehicle, and said fender includes a ski adapted to ride on the ground and prevent said fender from digging into the ground, and said ski includes a plow adapted to bite into the ground and stabilize said fender.

3. An agricultural implement as defined in claim 2, wherein said fender is hinged to said frame and adjustment means are provided to regulate the height of said fender relative to ground terrain.

4. A raking implement as defined in claim 1 in which said means for mounting the frame embodies means for adjusting the attitude of the frame whereby the journal axis may be inclined from the vertical.